Patented Apr. 26, 1949

2,468,394

UNITED STATES PATENT OFFICE 2,468,394

CARNIVOROUS FISH REPELLENT

Alfred Dinsley, La Canada, Calif.

No Drawing. Application November 19, 1945,
Serial No. 629,715

3 Claims. (Cl. 167—13)

This invention relates to improved means for protecting persons forced down or cast away at sea from attacks by carnivorous fish such as sharks, barracuda and the like. The present application is a continuation in part of my companion application for Letters Patent Serial Number 543,974, filed July 7, 1944, which matured into Patent Number 2,389,719, on the 27th day of November, 1945. Said companion application is directed to the method involved while the present application is directed to the means by which my improvement is carried into practice.

The primary object of this invention is to provide means for protecting personnel forced down or cast away at sea from attacks by carnivorous fish such as sharks, barracuda and the like. Such personnel forced down or cast away at sea and in fish infested water often use life rafts or other life preserving apparatus and as they may be exposed to attacks by sharks, barracuda and the like it is very dangerous to shoot attackers because the spilling of blood is liable to attract packs of carnivorous fish. A further object is to protect cast aways; workers such as divers and others in infested waters, caissons, coffer-dams and the like; swimming areas; schools of fish, netted and/or un-netted; fishing gear, etc.

To carry my invention into effect, one example within the spirit thereof is to employ substantially 90% strength formic acid intimately mixed with finely ground asbestos or other suitable filler until a firm mass is obtained. This mass in moist condition may be used as produced or it may be molded and dried or it may be comminuted and packed into containers which are varnished to protect them from the effects of contact with the formic acid. Said containers may be perforated or so prepared as to permit free dispersion of the formic acid-asbestos mixture into the sea.

One of the important actions of the chemical compound when dispersed in sea water is to attack the organs of respiration of the fish, particularly the mebraneous luminae, gill arches and gill slits and quickly deprive said organs of respiration of their natural glutenous coating with the result that the entire gill apparatus will become hardened and will not function. A fish so affected will promptly leave for areas remote from the locale where the chemical dispersion occurs. The personnel will thus be afforded a chance to survive.

The containers may be made out of substances of animal, vegetable or mineral origin and provided with a float composed of wood, plastic, kapok, cork and other material which will suspend the dispersal container which is charged with the chemical compound at comparatively surface or near surface level of the sea or other body of water. Each float and dispersal container may constitute a unit and several units may be carried by personnel, together with the usual signaling means. The chemical compound is readily miscible and is controlled by the compactness and pressure of the filler, a highly compressed body of filler thus retarding and prolonging the dispersion of the chemical compound and its action.

Formic acid is the first member of the fatty acids in the paraffine series and is readily soluble in sea water. Other acids and compounds in the same or other groups may be used effectively as a repelling medium within the spirit of my invention to cause carnivorous fish to leave areas where the chemical disperson is applied. Among chemical means additional to formic acid and fatty acids of the paraffine group which may be employed are astringents such as alum and its salts, tannin and its salts and formaldehyde. These may be used as hardening agents and/or coagulating agents. Also on the other hand a mixture of formic acid and salts of zinc such as zinc silicfluoride may be used as stripping or deglutinating agents.

To repel carnivorous fish attackers in fish infested waters it is essential to subject the breathing apparatus of the attackers to the physical effects of either a hardening or denuding agent or the combination of the two as provided by my invention.

In addition to providing means for attacking the gill apparatus of the fish I have also added coloring material of animal, vegetable or mineral origin to the mixture of hardening and denuding agents and dispersing medium. The coloring material may consist of antimony, plumbago, iron oxide, bone black, walnut juice, or aniline dye stuff and the like. Any one or combination of these ingredients may be incorporated into the filler of ground asbestos or other suitable material and the latter pressed into any geometrical forms or held in containers for dispersion of the repelling and coloring agents simultaneously in infested waters. In this manner and by this means the vision of the attacking fish is so affected as to provide additional means for discouraging and preventing attacks by carnivorous fish. Also the coloring means provides means for effectively indicating areas on the surface of water so treated.

In accordance with the patent statutes I have described the principles of operation of my invention, together with the means by which the same is carried into practice but I desire to have it understood that the means disclosed is only illustrative and that the invention can be carried out by other means and applied to uses other than those above set forth within the spirit thereof and within the scope of the following claims.

I claim:

1. A carnivorous fish repellent for use in fish infested waters, comprising a preformed, shaped mass of finely ground asbestos fibers impregnated with formic acid, molded and dried into a compact, dispensing unit adapted, when cast into a body of fish infested water, to evolve and disperse said formic acid into said water to attack the gill apparatus of carnivorous fish.

2. A carnivorous fish repellent for use in fish infested waters, comprising a preformed, shaped mass of finely ground asbestos fibers impregnated with formic acid and a coloring material, molded and dried into a compact, dispensing unit, adapted, when cast into a body of fish infested water, to evolve and disperse said formic acid into said water to attack the gill apparatus of carnivorous fish and to indicate the local area of the water where the dispensing unit is cast therein.

3. An article of manufacture useful as a carnivorous fish repellent in fish infested waters, comprising a unitary, pervious container containing finely ground asbestos fibers impregnated with formic acid and containing a coloring material, and a float on said container for holding the same near the surface of the fish infested water when placed therein, so that the contents of the container are dispersed therefrom into the surrounding water to attack the gill apparatus and the vision of the carnivorous fish and to indicate the local area of the water where the container is cast therein.

ALFRED DINSLEY.

REFERENCES CITED

The following references are of record in the file of this patent:

UNITED STATES PATENTS

| Number | Name | Date |
|---|---|---|
| 1,716,423 | Claval | June 11, 1929 |
| 2,389,719 | Dinsley | Nov. 27, 1945 |

OTHER REFERENCES

Sulima, Chemical Abstracts, vol. 4, 1910, page 1193.

Krczil, Chemical Abstracts, vol. 26, 1932, page 2101.